United States Patent [19]

De Prycker

[11] Patent Number: 4,817,085
[45] Date of Patent: Mar. 28, 1989

[54] DATA COMMUNICATION SYSTEM HAVING A PACKET SWITCHING NETWORK

[75] Inventor: Martin L. F. De Prycker, Sint, Belgium

[73] Assignee: Alcatel N.V., Amsterdam, Netherlands

[21] Appl. No.: 908,545

[22] Filed: Sep. 18, 1986

[30] Foreign Application Priority Data

Sep. 19, 1985 [BE] Belgium .............................. 2/60795

[51] Int. Cl.⁴ ........................... H04J 3/26; H04L 1/00
[52] U.S. Cl. ....................................... 370/60; 370/108
[58] Field of Search ................. 370/60, 106, 108, 94, 370/100, 17

[56] References Cited

U.S. PATENT DOCUMENTS

| | | | |
|---|---|---|---|
| 4,317,195 | 2/1982 | Barberis et al. | 370/60 |
| 4,320,500 | 3/1982 | Barberis et al. | 370/60 |
| 4,538,259 | 8/1985 | Moore | 370/60 |
| 4,556,970 | 12/1985 | Flanagin et al. | 370/60 |
| 4,630,262 | 12/1986 | Callens et al. | 370/94 |

OTHER PUBLICATIONS

"Voice Flow Regulator in a Digital Packet Voice Network", IBM Technical Disclosure Bulletin, vol. 27, No. 10A, Mar. 1985, pp. 5727–5728.

Primary Examiner—Douglas W. Olms
Assistant Examiner—Melvin Marcelo
Attorney, Agent, or Firm—Spencer & Frank

[57] ABSTRACT

The data communication system includes a packet switching network (PSN), a plurality of user circuits (UC), and a plurality of sender/receiver circuits (SEND/REC). Each sender/receiver circuit is coupled between the network (PSN) and at least one of the user circuits (UC). Each sender circuit (SEND) of an originating sender/receiver circuit being able to transmit packets received from an originating user circuit on the network and each receiver circuit (REC) of a destination sender/receiver circuit coupled to a destination user circuit including a timing circuit (TC) to subject received packets to a delay (T). This delay (T) is so chosen (Tm) that with a predetermined probability the error in a delayed packet is always less than a predetermined value (A).

15 Claims, 5 Drawing Sheets

DATA COMMUNICATION SYSTEM HAVING A PACKET SWITCHING NETWORK

BACKGROUND OF THE INVENTION

The present invention relates to a data communication system including a packet switching network, a plurality of user circuits, and a plurality of sender/receiver circuits each coupled between said network and at least one of said user circuits, each sender circuit of an originating sender/receiver circuit being able to transmit packets received from an originating user circuit on said network and each receiver circuit on a destination sender/receiver circuit coupled to a destination user circuit including a timing circuit to subject received packets to a delay.

Such a system is already known from the article "Analysis and Optimal Design of a Packet-Voice Receiver" by G. Barberis and D. Pazzaglia, published in the IEEE Transactions on Communications, Vol. Com. 28, No. 2, February 1980, pp 217–227.

In this known data communication system the sender generates data packets from talk spurts produced in an originating user circuit. As these talk spurts are separated by silent periods a set of distinct series of data packets is produced. In a first embodiment of this known system no information is gathered on the delay to which the packets are subjected in the network and a clock in the receiver circuit is set in accordance with the clock in the sender circuit, a time interval equal to the above delay after the receipt of each first packet of a series. As the network delay is a random value it might happen in a worst case, i.e. when the network delay suffered by a first packet of a series is very small, that one or more following packets of the series do not arrive in time at the receiver because they have suffered a too large delay in the network. For each of these packets one waits until it is completely received before feeding it to the destination user circuit. Thus each of these packets is subjected to an additional variable delay which adversely affects the operation quality of the system. When, in a worst case, the maximum of the network delays become larger than the time interval separating the series under consideration from the following one in the set, it is clear that bits will be lost. In the above mentioned article such a worst case is not considered, perhaps because a reduced quality is allowable in the case of voice and maybe especially because the occurrence of such a worst case is then very doubtful as the average time interval between two consecutive series of packets is equal to the duration of each of these series, as mentioned in the above article. Also, it only affects the quality of the relatively small corresponding series of packets and not of the other ones.

However, this would not be the case if the series of packets were relatively very long and if the nature of the data was unknown, i.e. constituted by a continuous bitstream of voice, video or other data or a mixture thereof. Indeed, then the loss of bits would not be allowable since these bits could have a high importance and because the reduced quality would then affect the whole series of packets.

SUMMARY OF THE INVENTION

An object of the present invention is to provide a data communication system of the above type, but which has a good operation quality independently of the nature of the data transmitted and of the length thereof.

According to the invention this object is achieved due to the fact that said delay is so chosen that with a predetermined probability the errors in delayed packets are always less than a predetermined value.

In this way a wanted operation quality of the system is ensured.

The present invention also relates to a data communication system including a packet switching network, a plurality of user circuits and a plurality of sender/receiver circuits each including a clock and being coupled between said network and at least one of said user circuits, each sender circuit of an originating sender/receiver circuit being able to transmit packets, containing sender clock position information, on said network and each receiver circuit of a destination sender/receiver circuit being able to synchronize its clock with that of the sender in function of the clock information received with said packets.

Such a data communication system is also known from the above mentioned article. Therein sender clock position information is included in data packets so that data bits might be lost in the receiver when the clock thereof is synchronised with that of the sender.

Another object of the present invention is to provide a data communication system of the last mentioned type, but which does not present this drawback.

According to the invention this object is achieved due to the fact that at most the last of said packets includes data which are fed to said destination user circuit after synchronization.

Thus there is no danger of losing data bits during the synchronization of the clocks.

BRIEF DESCRIPTION OF THE DRAWINGS

The above mentioned and other objects and features of the invention will become more apparent and the invention itself will be best understood by referring to the following description of embodiments taken in conjunction with the accompanying drawings wherein.

DESCRIPTION OF THE PREFERRED EMBODIMENTS

Figure 1:
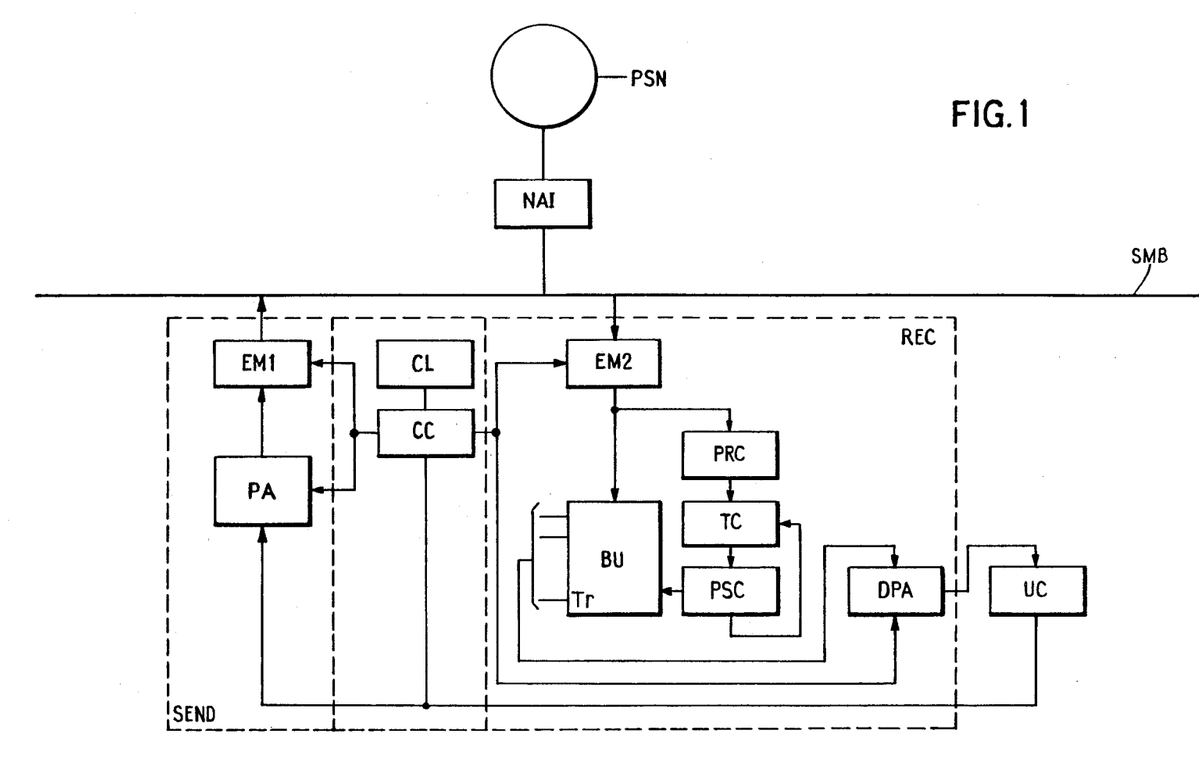
FIG. 1 is a schematic view of a first embodiment of a data communication system according to the invention.

Referring to FIG. 1, the data communication system shown therein includes a packet switching network PSN to which each of a plurality of user circuits, such as UC, is coupled via a sender/receiver circuit SEND/REC, a bus MB and a network access interface circuit NAI.

The sender/receiver circuit SEND/REC includes a sender SEND, a receiver REC and a common computer CC with an associated clock CL. This computer CC controls both the sender and the receiver and the clock CL is connected to various circuits of the system although this is not shown.

The sender SEND includes a packetizer circuit PA and an exchange memory EM1 which are connected in cascade between an output of the user circuit UC and the bus SMB and are controlled by the computer CC. The receiver REC includes an exchange memory EM2, a buffer unit BU with size Tr, a packet recognition circuit PRC, a timing circuit TC, a packet search circuit PSC and a depacketizer circuit DPA which together with EM2 is controlled by the computer CC. EM2, BU and DPA are connected in cascade between the bus SMB and an input of UC and EM2, PRC and TC are connected in cascade between SMB and an input of PSC whose outputs control BU and TC respectively.

The user circuit UC is able to provide address information to the computer CC and to generate and receive a continuous bitstream which may be constituted by voice, video or other data or a mixture thereof. This bitstream has a bit rate of B bits/sec, e.g. 2 Mbit/sec, and begins with a start code. To be noted that the contents of the bitstream are without importance for the operation of the system.

The network access interface circuit NAI controls the access of the network PSN, the transfer of data from EM1 to the network via the bus SMB and the transfer of data from this network to EM2 via the bus SMB. In the PSN transfer of data is for instance performed by using the token procedure.

Figure 2:
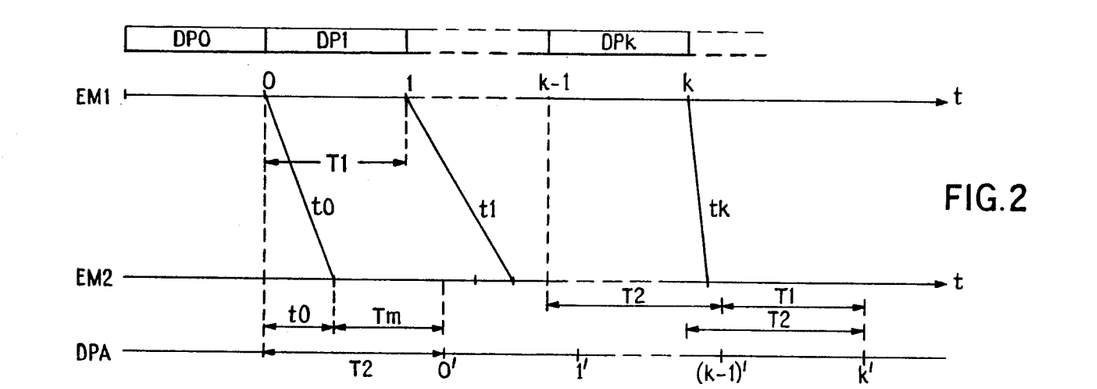
FIG. 2 is a time diagram illustrating the operation of this embodiment.

The above described system operates as follows, reference being made to FIGS. 1 and 2.

When the originating user circuit UC wants to transfer a continuous bitstream of data to a destination user circuit, it communicates the address of this destination to the common computer CC where it is stored in the computer memory (not shown). The computer CC then informs the UC that it can start the transmission of the continuous bitstream of data at a rate of B bits/sec.

In the packetizer PA this bitstream is subdivided into packets DP0, DP1, . . . , DPk, . . . etc. of length L or duration $T1 = L/B$, and these packets are supplied to the exchange memory EM1. Therein the computer CC adds to each packet a header comprising the address of the destination user circuit and a serial packet number which is function of the position of the sender clock CL. For instance, the serial number of each of the packets DPk (with $k = 0, 1, \ldots$) is indicated by k corresponding to the position k of the clock CL. Each such packet is then transferred from EM1 on the network PSN via the bus SMB under the control of the interface circuit NAI.

When the address of such a packet is recognized by the destination interface circuit NAI, this packet is transferred to the exchange memory EM2 via the bus SMB under the control of NAI. Because the network PSN has a stochastic behaviour the packets arrive in EM2 after a random delay which is equal to $t0, t1, \ldots, tk, \ldots$ for the packets DP0, DP1, . . . , DPk, . . . respectively. As a consequence the packets arrive in EM2 in the right order or not. Under the control of the computer CC these packets are then stored in the buffer unit BU and supplied to the packet recognition circuit PRC. In the packet recognition circuit PRC the arrival of the first packet DP0 is detected from the serial number 0 coded in the header of this packet. When this happens the PRC starts the timer circuit TC which after having counted a time Tm activates the packet search circuit PSC. The latter circuit PSC then searches in the buffer unit BU for the first packet DP0 and transfers it to the depacketizer circuit DPA at the clock tick 0'. The PSC also restarts the timing circuit TC which after having counted a time T1 (clock tick 1') again activates the packet search circuit PSC. The latter circuit then searches in the buffer unit BU for the second packet DP1 and transfers the buffered portion thereof to the DPA. In case the packet DP1 is not available at the clock tick 1' it is discarded afterwards. All the following packets DP2, . . . are processed in the same way as packet DP1.

From the above it follows that the first packet DP0 is submitted to a total delay $T2 = t0 + Tm$ and that all the following packets DP1, . . . are subjected to the same delay. However, it is clear that in the buffer unit BU packets may be stored a longer time, with a maximum equal to the buffer size Tr expressed in time units.

The delay Tm has been introduced to smooth the influence of the random network delay since such a random delay cannot be tolerated at the input of the destination user circuit, especially when video or voice are concerned, for reasons of quality.

It is now explained how the above value Tm of the delay T of the first packet DP0 and the buffer size Tr expressed in time units, were chosen.

When calling:

$$T2 = t0 + T \tag{1}$$

the total delay suffered by the first packet DP0;
P(t) the cumulative probability function of the delay of a packet in the network;
p(t) the probability density function of P(t);
the following situations may occur for the packet DPk:

$$tk = < T2$$

In this case the packet DPk arrives in time in the destination receiver so that it can be completely used therein. This occurs with a probability P(T2);

$$T2 < tk < T2 + T1$$

In this case a first part (i bits) of the packet DPk arrives too late, whereas a second part thereof (L-i bits) is in time as it arrives before the clock tick of the next packet. Only L-i bits of this packet can be used in the destination receiver if $$T2 + \frac{i-1}{B} < tk = < T2 + \frac{i}{B}$$

with i variable between $i = 1$ and $L - 1$.
This occurs with a probability P1 given by $$P1 = P\left(T2 + \frac{i}{B}\right) - P\left(T2 + \frac{i-1}{B}\right) \tag{2}$$

To be noted that the missing i bits are replaced by a dummy code.

$$tk > = T2 + T1$$

In this case the whole packet DPk does not arrive in time and has to be discarded. This occurs with a probability $$P2 = 1 - P(T1 + T2) \quad (3)$$

From the above it follows that the average packet length which can be used in the destination receiver and which is called L(T2) because it depends on T2 is given by $$L(T2) = L \cdot P(T2) + \sum_{i=1}^{L-1}(L - i) \cdot P1 \quad (4)$$

or, with the relation (2), by $$L(T2) = \sum_{i=0}^{L-1} P(T1 + T2) \quad (5)$$

A probability function which is a good model of the delay experienced in many packet networks is the gamma distribution with a k factor (the power of t in the following formula) equal to 1. In this case one has:

$$p(t) = q^2 \cdot t \cdot e^{-qt} \text{ for } t \geq 0 \quad (6)$$

and $$P(t) = 1 - e^{-qt} - q \cdot t \cdot e^{-qt} \text{ for } t \geq 0 \quad (7)$$

wherein 2/q is the average delay of the network.
The relation (5) may thus be written:

$$L(T2) = L - e^{-q \cdot T2}(M + N + M \cdot q \cdot T2) \text{ for } t \geq 0 \quad (8)$$

$$\text{with } M = \sum_{i=0}^{L-1} e^{-q \cdot i/B} \quad (9)$$

$$\text{and } N = \sum_{i=0}^{L-1} \frac{q \cdot i}{B} e^{-q \cdot i/B} \quad (10)$$

The value of T2 is so determined that a Bit Error Rate BER at most equal to A, or a minimum quality 1−A, is obtained, the BER being the inverse of the number of bits presently a single error or missing bit. This happens when T2 has at least a minimum value Tm satisfying $$\frac{L - L(Tm)}{L} = < A \quad (11)$$

or, with the relation (8), when $$e^{-q \cdot Tm}(M + N + M \cdot q \cdot T2) = < L \cdot A \quad (12)$$

For instance, for
A = $10^{-6}$
L = 5000 bits
1/q = 250 microseconds
B = 2 Mbit/sec.
Tm is found to be equal to 3.57 milliseconds.

Because of the relation (1) and since the delay to of the first packet in the network is unknown T2 is a random variable, so that it is impossible to have T2 equal to Tm for every value of to. However, T2 has to be equal to Tm even when to has its minimum value which is equal to zero (theoretically) in the case of the gamma distribution. For this reason the value of T is chosen equal to Tm so that $$T2 = to + Tm \quad (13)$$

The delay of the first packet may be so large that packets transmitted after the first one are received before the first packet. In order not to lose such packets it is clear that they should be temporarily stored in a buffer BU (FIG. 1) until the first packet DP0 has been supplied to the DPA and that to this end the size (in time units) Tr of the buffer BU should be equal to T2. However, because T2 is a random variable, as already mentioned, the buffer BU has been given a maximum size corresponding to a delay time Tr such that the probability that Tr remains larger than or is equal to T2 (so that no packets will be lost) has a predetermined value Q, as close as possible to unity, given by $$Q = P(Tr = > T2) \quad (14)$$

or $$Q = P(to = < Tr - Tm) \quad (15)$$

because of the relation (13)

$$\text{or } Q = \int_0^{Tr - Tm} p(t) \, dt \quad (16)$$

For the probability density function given by the relation (6) the relation (16) becomes $$Q = 1 - e^{-q(Tr - Tm)} - q(Tr - Tm)e^{-q(Tr - Tm)} \quad (17)$$

For instance, when Q = 0.999999 and with Tm = 3.57 milliseconds, as calculated above, one finds Tr = 7.75 milliseconds.

For a smaller Q, the value of Tr decreases quite rapidly and is for instance equal to 5.89 milliseconds when Q = 0.999.

In the above described first embodiment the delay T2 is determined without having any knowledge of the network delay to which the first packet DP0 is submitted.

Figure 3:
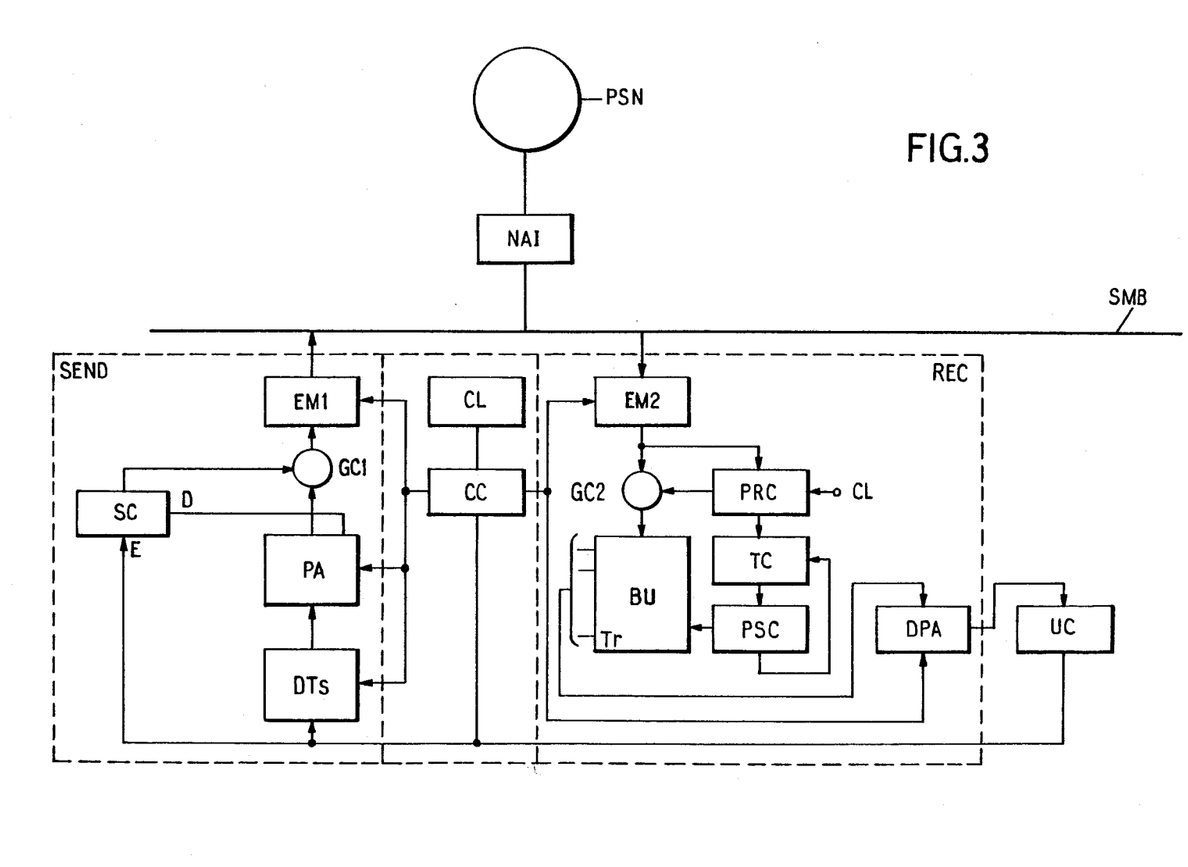
FIG. 3 is a schematic view of a second embodiment of this system.

In a second embodiment of the system, shown in FIG. 3, use is made of an estimation algorithm for the network delay, the minimum of this delay being zero (theoretically) in case of the gamma distribution considered. This algorithm is described in the article referred to above and is based on the use of the above serial number or clock position information for synchronizing the receiver clock with the sender clock. More particularly, use is made of the clock position information included in n synchronization packets SP0 to SPn−1 and possibly in the first (DP0) of the data packets following these synchronisation packets.

The data communication system shown in FIG. 3 differs from that of FIG. 1 in that the sender SEND moreover includes a delay unit DTs, a synchronization circuit SC and a gating circuit GC1. The circuits DTs, PA, GC1 and EM1 are connected in cascade between an output of the user circuit UC and the bus SMB and DTs, PA and EM1 are controlled by the computer CC. The synchronization circuit SC has an enable input E controlled by UC, a disable input D controlled by PA and an output connected to EM1 through the gating circuit GC1.

The receiver circuit REC of FIG. 3 differs from that of FIG. 1 in that it moreover includes a gating circuit GC2 which couples the output of EM2 to the input of BU and which is controlled by the packet recognition circuit PRC. To be noted however that the function of the PRC differs from that used in the system of FIG. 1. Also the clock input CL of the PRC is now explicitly shown.

Figure 4:
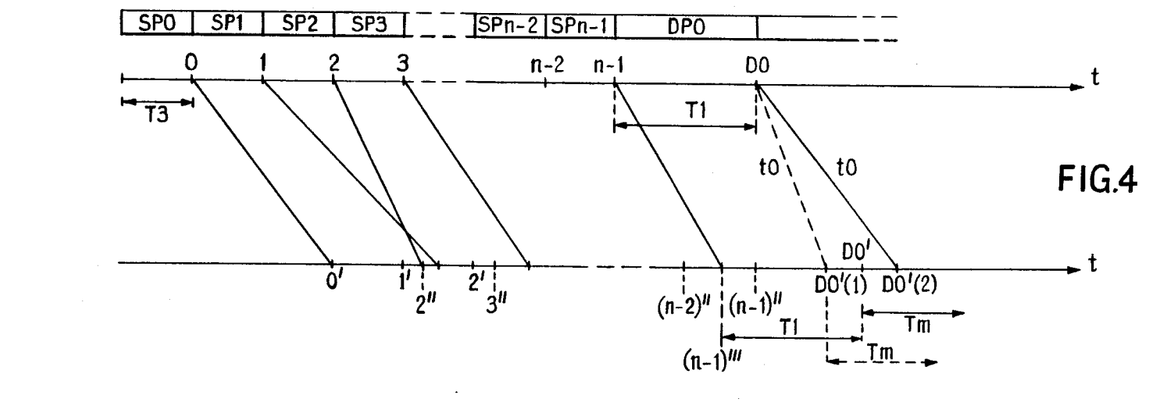
FIG. 4 is a time diagram illustrating the operation of this embodiment.

The system just described operates as follows, reference being made to FIGS. 3 and 4.

When the originating user circuit UC wants to transfer a continuous bitstream of data to a destination user circuit, it communicates the address of this destination to the common computer CC where it is stored in the computer memory (not shown). The computer CC then informs the UC that it can start the transmission of the continuous bitstream of data at a rate of M bits/sec. This data bitstream is fed to the delay unit DTs wherein it is submitted to a delay equal to Ts, before being applied to the packetizer circuit PA. Meanwhile, the start code of this bitstream activates the enable input E of the synchronization circuit SC. When operated this circuit generates n synchronization packets SP0 to SPn−1 at a rate of M packets/sec, each such packet containing a code indicating that it is a synchronization packet. Each such synchronization packet is supplied to the exchange memory EM1 via the gating circuit GC1 and in EM1 a header comprising the address of the destination user circuit and a serial number related to position of the clock CL is added to the synchronization packet under the control of the computer CC. This happens in the same way as described in relation with the system of FIG. 1 for a data packet. In FIG. 4 the clock positions of the n synchronization packets SP0 to SPn−1 are indicated by O to n−1 respectively, whereas those of the data packets DP0, . . . etc. are indicated by D0, . . . etc.

At the moment all the bits of the first data packet DP0 have been entered in the packetizer circuit PA, i.e. after a time Ts+T1, and that this first data packet is ready for transmission to the exchange memory EM1, the PA activates the disable input D of the synchronization circuit SC so as to stop the transmission of synchronization packets SP0 to SPn−1.

From the above it follows that in the sender the synchronization packets are transmitted during a time interval equal to $$Ts+T1$$

wherein T1=L/B, so that $$n=(T1+Ts).M \qquad (18)$$

n being the largest integer smaller than (T1+Ts).M.

Each of the synchronization and data packet stored in the exchange memory EM1 is transmitted to the exchange memory EM2 of a destination receiver in the way described above in relation with FIG. 1.

Under the control of the computer CC the packets received in EM2 are supplied to the packet recognition circuit PRC and to the gating circuit GC2 which is supposed to be blocked. In the PRC the n synchronization packets SP0 to SPn−1 are recognized from tne information and serial numbers or clock ticks 0 to n−1 coded in the header of these packets. As long as the PRC recognizes the presence of synchronization packets, it maintains the gating circuit GC2 in the blocked position. On the contrary, when the PRC afterwards recognizes the arrival of the first data packet DPO, it opens the gating circuit GC2 so as to allow the passage of all the data packets to the buffer unit BU.

In the PRC which includes time comparator means (not shown) the n synchronization packets SP0 to SPn−1 and the immediately following first data packet DP0 are processed as follows, reference being particularly made to FIG. 4 which shows an example of such packets:

the PRC recognizes the first synchronization packet SP0 with clock position 0 and brings the receiver clock in the corresponding position 0'. Thus the gap between the sender and receiver clocks is equal to the random delay of the first synchronization packet SP0 over the network PSN;

the PRC upon receipt of one of the following synchronization packets SP1 to SPn−1 compares the clock position 1 to n−1 coded in these packets with the position of the running receiver clock and adjusts this position each time and only when the synchronization packet is received prior to the corresponding running clock tick. More particularly:

because the second synchronization packet SP1 with clock position 1 is received after the corresponding position 1' of the running receiver clock, this position is not adjusted;

because the third synchronization packet SP2 with clock position 2 is received in the clock position 2'', preceeding the position 2' of the running receiver clock, this position is adjusted to 2'';

since the fourth synchronization packet SP3 with clock position 3 is received after the corresponding clock position 3'' (equal to 3'+T3) of the running receiver clock, this position is not adjusted;

etc. Hereby it is supposed that after the receipt of the synchronization packet SPn−2 the receiver clock is in the position (n−2)'';

because the last synchronization packet SPn−1 with clock position n−1 is received in the clock position (n−1)''' preceeding the corresponding clock position (n−1)'' of the running clock, this position is adjusted to (n−1)'''.

As already mentioned above, after the receipt of the last synchronization packet the PRC opens the gating circuit GC2 so that the data packets are then simultaneously supplied to the buffer unit BU and to the PRC. The PRC then starts a timing TI and at the end thereof (clock tick D0') activates the timing circuit TC. The latter then counts a time interval Tm after which it operates the packet search circuit PSC. The function of PSC, BU, TC, DPA and UC is the same as described above in relation to FIG. 1.

In a preferred embodiment the PRC also makes use of the clock position information contained in the header of the first data packet DP0 to realise a final adjustment of the receiver clock if the DP0 is received before the above mentioned clock tick D0', e.g. at the clock tick D0' (1). In this case the PRC adjusts the receiver clock to D0' (1) before activating the timing circuit TC which counts the time interval Tm. If the packet DP0 is received after D0', e.g. in D0'(2), the clock is not adjusted.

From the above it follows that by the use of the n synchronization packets, and in the preferred embodiment also of the first data packet, the receiver clock has been adjusted to the sender clock and that the first data packet DP0 has then been delayed over a time interval Tm. It is clear that this adjustment is not perfect and that there remains some error which is called −te, so that the total delay of the first data packet is equal to Tm−te.

It is now explained how the above value Tm of the delay T of the first data packet DP0 and the buffer size Tr where chosen.

It is clear that the quality of the estimation of the network delay obtained in the way described above depends on the number of clock position information containing packets used. From the previously mentioned article and more particularly from the relation (41) thereof, it follows that the probability density function of the gap between the sender and receiver clocks and thus the estimation error of the receiver after the receipt of n+1 such packet is given by $$p1(t) = (n+1)p(-t)[1-P(-t)]^n \text{ for } t = <0 \quad (19)$$

The latter expression is defined for negative values of t only, because the estimation error is defined as the difference between an underestimate of the random network delay and the actual value thereof.

In the case of the gamma distribution, as defined by the relations (6) and (7), the relation (19) becomes $$p1(t) = -(n+1)q^2 e^{(n+1)\cdot q \cdot t}(1-qt)^n \quad (20)$$

From the above it follows that instead of synchronizing the clocks a time T after the reception of the first data packet, i.e. after a time T2=to+T as in the system of FIG. 1, both the clocks are now synchronized, with an error -te, after a number of synchronization packets and the first data packet have been received, the latter data packet being then submitted to the delay T. Hence the total delay T2 is given by $$T2 = T - te \text{ with } te = <0 \quad (21)$$

Since T and te are independent random variables, tied by the relation (21), one may calculate that the distribution density of T2 is given by:

$$p2(t) = -(n+1)q^2(T-t)e^{(n+1)q(T-t)}[1-q(T-t)]^n \quad (22)$$

with $t - T > = 0$

In an analogous way as described above for the system of FIG. 1 the minimum value Tm of T2 may be calculated from the relation (12) resulting in an equal value as for the latter system. On the other hand, and again in an analogous way as for the system of FIG. 1, the buffer size Tr is so calculated that the probability that Tr remains larger than or equal to T2 has a predetermined value Q, as close as possible to 1, given by the relation (14) or $$Q = \int_0^{Tr} p2(t) \cdot dt \quad (23)$$

By taking the relation (22) into account this probability may be written:

$$Q = (n+1)^n [f_n(1) - f_n(a)] \quad (24)$$

wherein $$a = 1 - q(T - Tr) \quad (25)$$

and $$fn(x) = -e^{(1-x)(n+1)} \sum_{j=0}^{n+1} \frac{[x(n+1)]^{n-j}}{(n+1-j)!} n![(1-x)(n+1) - j] \quad (26)$$

Figure 5:
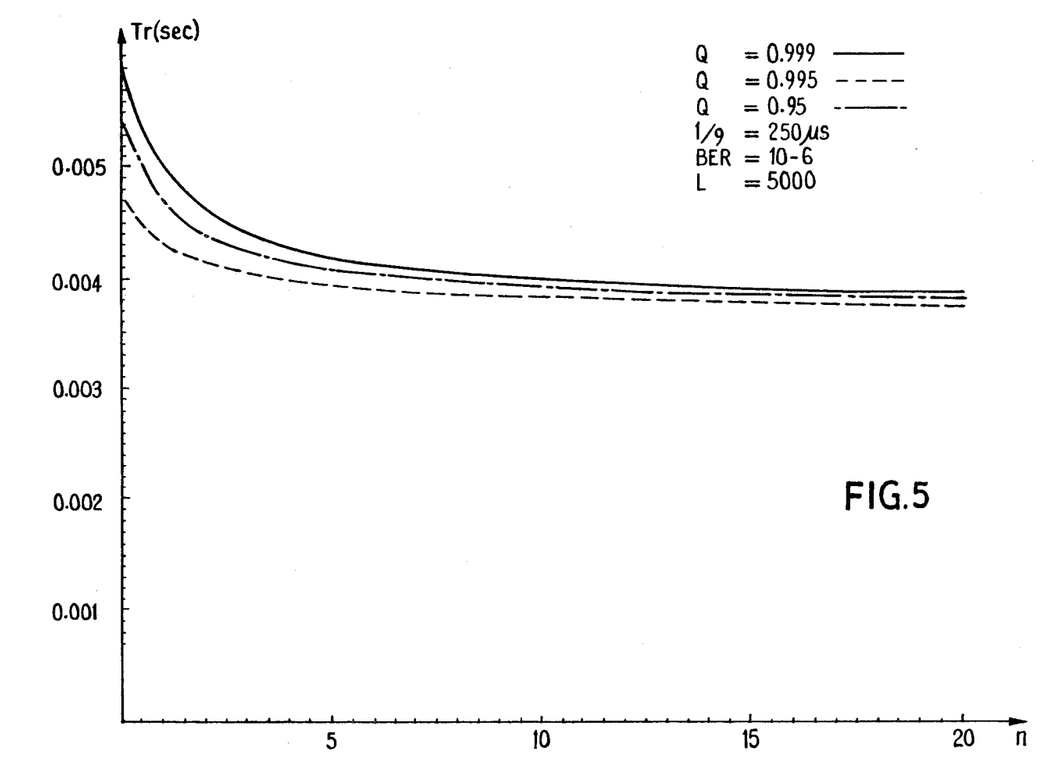
FIG. 5 is a diagram showing the variation of the size of the buffer BU of FIG. 3 in function of the number of clock position containing packets.

From the relations (24), (25) and (26) one may compute Tr in function of n for different values of Q, the other variables q, BER and L being constant. FIG. 5 more particularly shows Tr in function of Q for the values Q=0.999; Q=0.995 and Q=0.95 respectively, in case 1/q=250 μs, BER=10⁻⁶ and L=5000. From this figure it follows that the difference in Tr is small for the different values of Q and that Tr decreases rapidly for n increasing from 0 onwards, but that for larger n the increase in Tr is small when n increases. Also, it appears that a substantially constant Tr is already obtained for a relatively small value of n.

Because the delay Tr in the receiver is function of the number n of synchronization packets emitted by the sender and because n is function of the delay Ts in this sender, as follows from the relation (18), the delay Tr is function of Ts.

Figure 6:
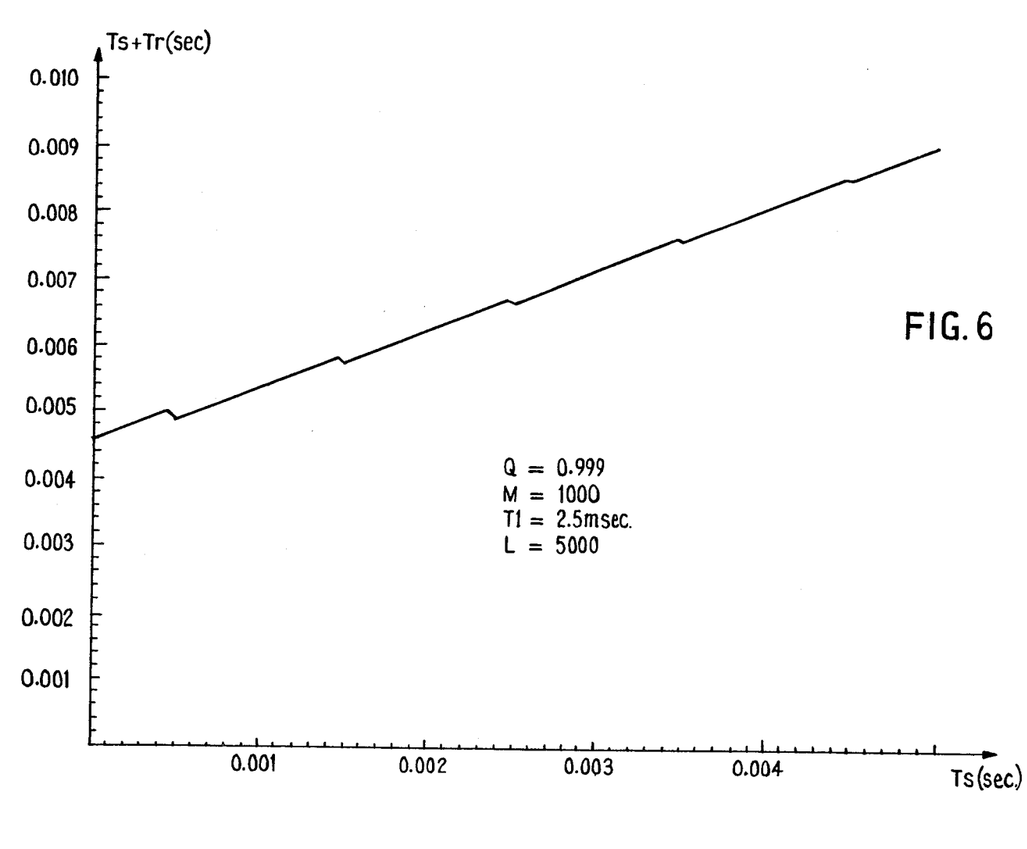
FIG. 6 shows the delays Ts+Tr in function of Ts, Ts and Tr being provided by DTs and BU of FIG. 3 respectively.

FIG. 6 shows Ts+Tr in function of Ts for
Q=0.999
M=1000
T1=2.5 milliseconds
L=5000

From this figure it follows that Ts+Tr is a generally increasing function whose minimum value occurs for Ts=0. This means that for the above values no additional delay Ts is required in the sender so that it is sufficient to transmit synchronization packets during the time T1 only. However, when an analogous figure is drawn for a much higher Q, e.g. Q=0.999999, but for the same values of M, T1 and L, the minimum value of Ts+Tr is still Ts=0 but there is another value of Ts for which Ts+Tr is very close to this minimum. It might therefore be that for other values of the variables, such as Q almost equal to 1, the minimum value of Ts+Tr is different from zero. In this case the use of the additional delay unit DTs would be justified.

While the principles of the invention have been described above in connection with specific apparatus, it is to be clearly understood that this description is made only by way of example and not as a limitation on the scope of the invention.

I claim:

1. Data communication system comprising a packet switching network (PSN), a plurality of user circuits (UC), and a plurality of sender/receiver circuits (SEND/REC) each coupled between said network (PSN) and at least one of said user circuits (UC), each sender circuit (SEND) to an originating sender/receiver circuit being able to transmit packets received from an originating user circuit on said network and each receiver circuit (REC) of a destination sender/receiver circuit coupled to a destination user circuit including a timing circuit (TC) to subject received packets to a delay (T), said delay (T) being so chosen that with a predetermined probability the errors in delayed packets are always less than a predetermined value (A), and said chosen value (Tm) of said delay (T) being such that it satisfies the relation $$\frac{L - L(Tm)}{L} = <A$$

wherein:

L is the packet length in bits;
A is said predetermined value;
L(Tm) is the value for T2=Tm of the average accepted packet length L(T2) given by $$L(T2) = \sum_{i=0}^{L-1} P\left(T2 + \frac{i}{B}\right)$$

with:
P(t) the cumulative probability of the delay of a packet over a said network, P(t) having a probability density p(t);
T2 the total delay of a packet over the network (PSN) and in said timing circuit (TC);
L-i the number of bits of a packet supplied towards said destination user circuit;
B the bit transmission speed.

2. Data communication system according to claim 1, characterized in that the sender and receiver of each of said sender/receiver (SEND/REC) include a packetizer circuit (PA) and a depacketizer circuit (DPA) respectively, that said originating user circuit is able to generate a continuous bitstream which is transformed into packets in the packetizer circuit (PA) of said originating sender/receiver circuit, and that the depacketizer circuit (DPA) of said destination sender/receiver circuit is able to transform received packets into a continuous bitstream which is then sent to said destination user circuit.

3. Data communication system according to claim 1, characterized in that the input of the receiver of each of said sender/receiver circuits (SEND/REC) is coupled to a buffer unit (BU) and to a packet recognition circuit (PRC) which is itself coupled to said timing circuit (TC) having access to a packet search circuit (PSC), said buffer unit (BU) storing the received packets and said packet recognition circuit (PRC) being able to recognize the first (DP0) of the received packets and to then activate said timing circuit (TC) which counts said chosen time delay (Tm) and then operates said packet search circuit (PSC) which transfers the packets stored in said buffer unit in the right order towards said destination user circuit starting with said first packet and in such a way that all the packets are subjected to the same total delay (T2=to+Tm) as that to which said first packet is subjected in said network (PSN) and in said timing circuit (TC).

4. Data communication system according to claim 3, characterized in that said buffer unit (BU) has a size corresponding to a buffer delay (Tr) satisfying the relation $$Q = \int_0^{Tr - Tm} p(t)\, dt$$

wherein:
Q is the probability, close to 1, that Tr> =T2;
Tr is said buffer delay;
Tm is said chosen time delay;
T2 is said total delay;
p(t) is the probability density function of the delay of a packet in the network.

5. Data communication system according to claim 1, characterized in that each of said sender/receiver circuits includes a clock (CL), that the sender of said originating sender/receiver circuit includes means (SC, CC) for transmitting on said network (PSN) a series of sender clock position containing packets (SP0/n−1), DP0), and that the receiver of said destination sender/receiver circuit includes a packet recognition circuit (PRC) which is able to recognize said sender clock position containing packets and to adjust the receiver clock in function of the sender position contained in said packets.

6. Data communication system according to claim 5, characterized in that said packet recognition circuit (PRC) includes comparator means and performs said receiver clock adjustment by making first the receiver clock equal or substantially equal to the sender clock position contained in the first (SP0) of said sender clock position containing packets (SP0/n−1, DP0) and in then adjusting the receiver clock each time said comparator means indicate that the clock position contained in a clock position containing packet following the first packet is smaller than the position of the running receiver clock.

7. Data communication system according to claim 5, characterized in that said sender clock position containing packets (SP0/n−1, DP0) comprise a plurality of synchronization packets (SP0/n−1) and a first data packet (DP0) of a plurality of data packets following said plurality of synchronization packets.

8. Data communication system according to claim 7, characterized in that the input of the receiver of each of said sender/receiver circuits (SEND/REC) is coupled to a buffer unit (BU) which is itself coupled to said timing circuit (TC), said packet recognition circuit (PRC) being able to inhibit and allow the storage of said synchronization and data packets in said buffer unit (BU) respectively and to activate said timing circuit (TC) after said clock adjustment has been performed or a predetermined time interval (T1) after the receipt of the last (SPn−1) of said synchronization packets.

9. Data communication system according to claim 8, characterized in that said timing circuit (TC) is coupled to a packet search circuit (PSC) and operates said packet search circuit (PSC) after having counted said chosen time delay (T), said packet search circuit (PSC) when operated transferring the packets stored in said buffer unit in the right order towards said destination user circuit.

10. Data communication system according to claim 9 in that said buffer circuit (BU) is coupled to said destination user circuit via said depacketizer circuit (DPA).

11. Data communication system according to claim 8, characterized in that said buffer unit (BU) has a size corresponding to a delay (Tr) satisfying the relation $$Q = \int_0^{Tr} p2(t)\, dt$$

wherein
Q is the probability, close to 1, that Tr> =T2;
Tr is the said buffer delay;
T2 is the total delay constituted by the sum of the delay in said timing circuit (TC) and the estimation error (−te) between said sender and receiver clocks after said adjustment;
p2(t) is the probability density function of said total delay (T2).

12. Data communication system according to claim 11, characterized in that $$p2(t)=p1(T-t)$$

wherein
T is said delay;
p1(t) is the probability density function of said estimation error.

13. Data communication system according to claim 1, characterized in that for said network (PSN) one has:

$$P(t)=1-e^{-qt}-qte^{-qt} \text{ for } t>=0$$

and $$p(t)=q^2te^{-qt} \text{ for } t>=0$$

wherein:
P(t) is the cumulative probability function of the network delay;
p(t) is the probability density function of P(t);
2/q is the average network delay.

14. Data communication system according to claim 1, characterized in that the sender of each of said sender/receiver circuits includes a delay unit (DTs) for additionally delaying said packets before transmission on said network.

15. Data communication system including a packet switching network (PSN), a plurality of user circuits (UC) and a plurality of sender/receiver circuits (SEND/REC) each including a clock (CL) and being coupled between said network (PSN) and at least one of said user circuits (UC), each sender circuit (SEND) of an originating sender/receiver circuit being able to transmit packets, containing sender clock position information, on said network and each receiver circuit (REC) of a destination sender/receiver circuit being able to synchronize its clock with that of the sender in function of the clock information received with said packets, characterized in that at most of last (DP0) of said packets includes data which are fed to said destination user circuit after synchronization.

* * * * *